May 9, 1961  H. L. GLASS  2,983,424
MULTIPLE COMPARTMENT BOX
Filed May 28, 1957  6 Sheets-Sheet 1
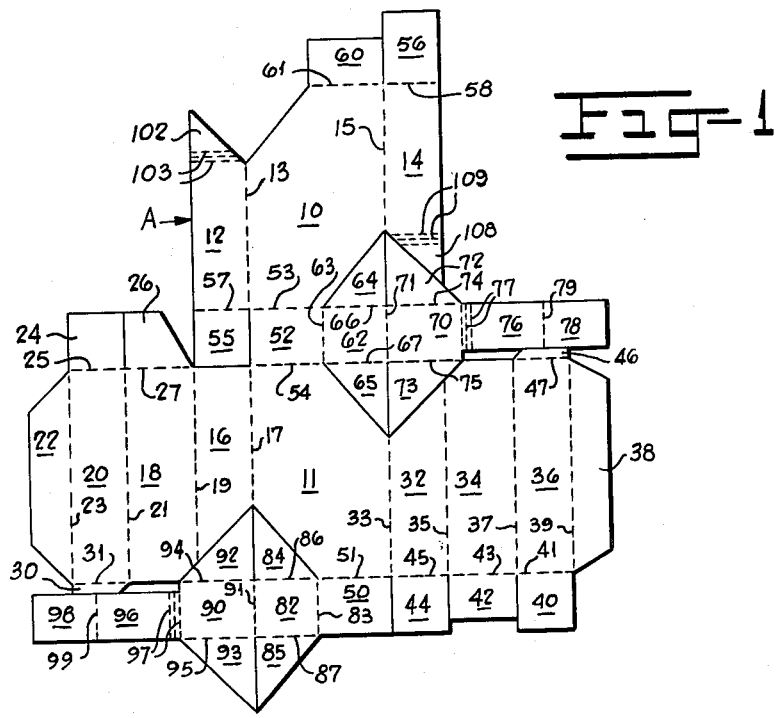
Fig-1
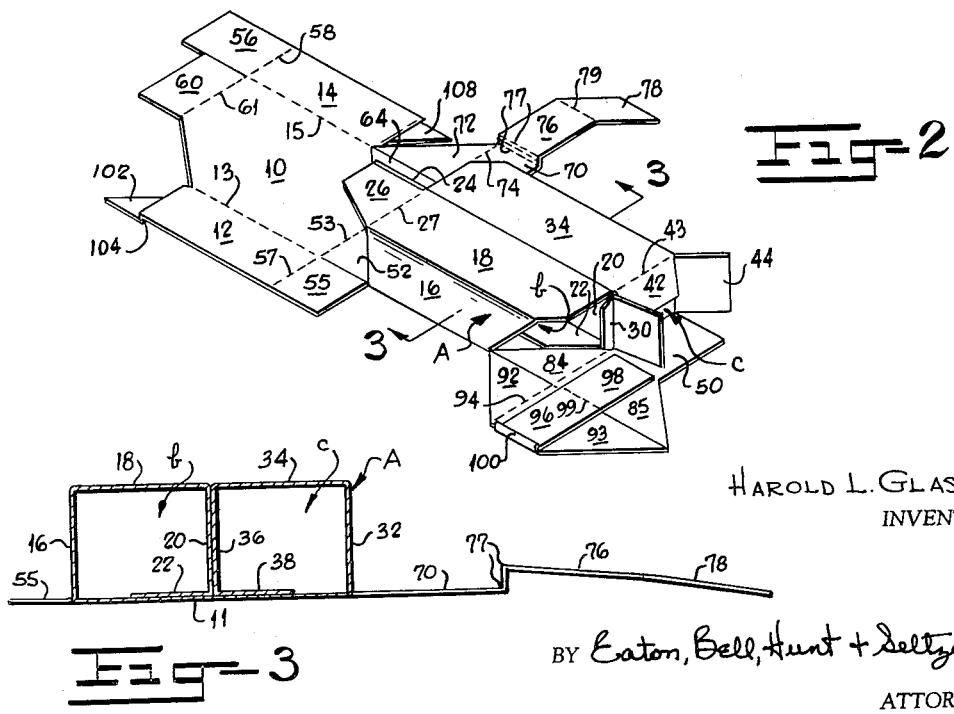
Fig-2
Fig-3
HAROLD L. GLASS,
INVENTOR.
BY Eaton, Bell, Hunt + Seltzer
ATTORNEYS May 9, 1961  H. L. GLASS  2,983,424
MULTIPLE COMPARTMENT BOX
Filed May 28, 1957  6 Sheets-Sheet 2
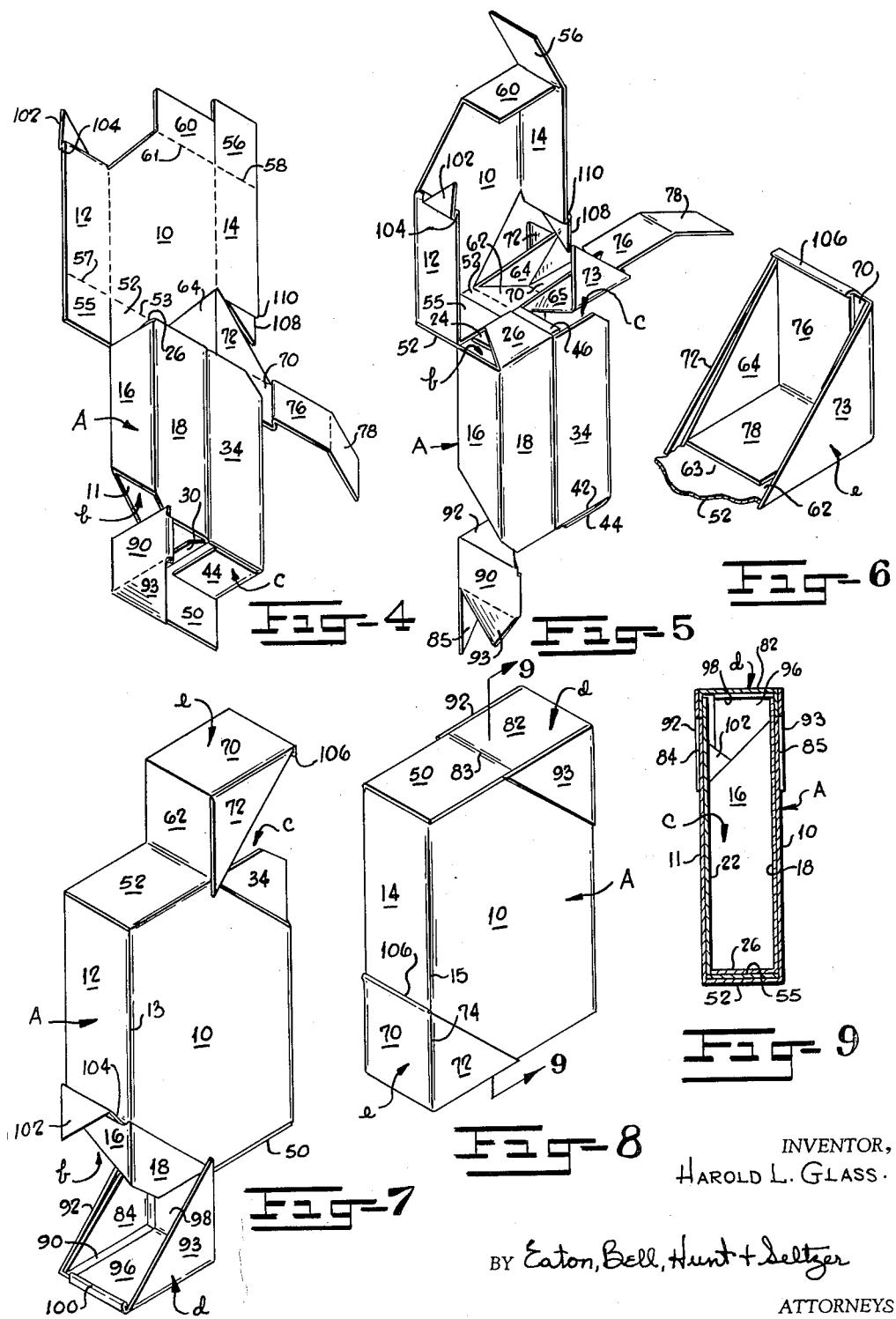
INVENTOR,
HAROLD L. GLASS.
BY Eaton, Bell, Hunt + Seltzer
ATTORNEYS

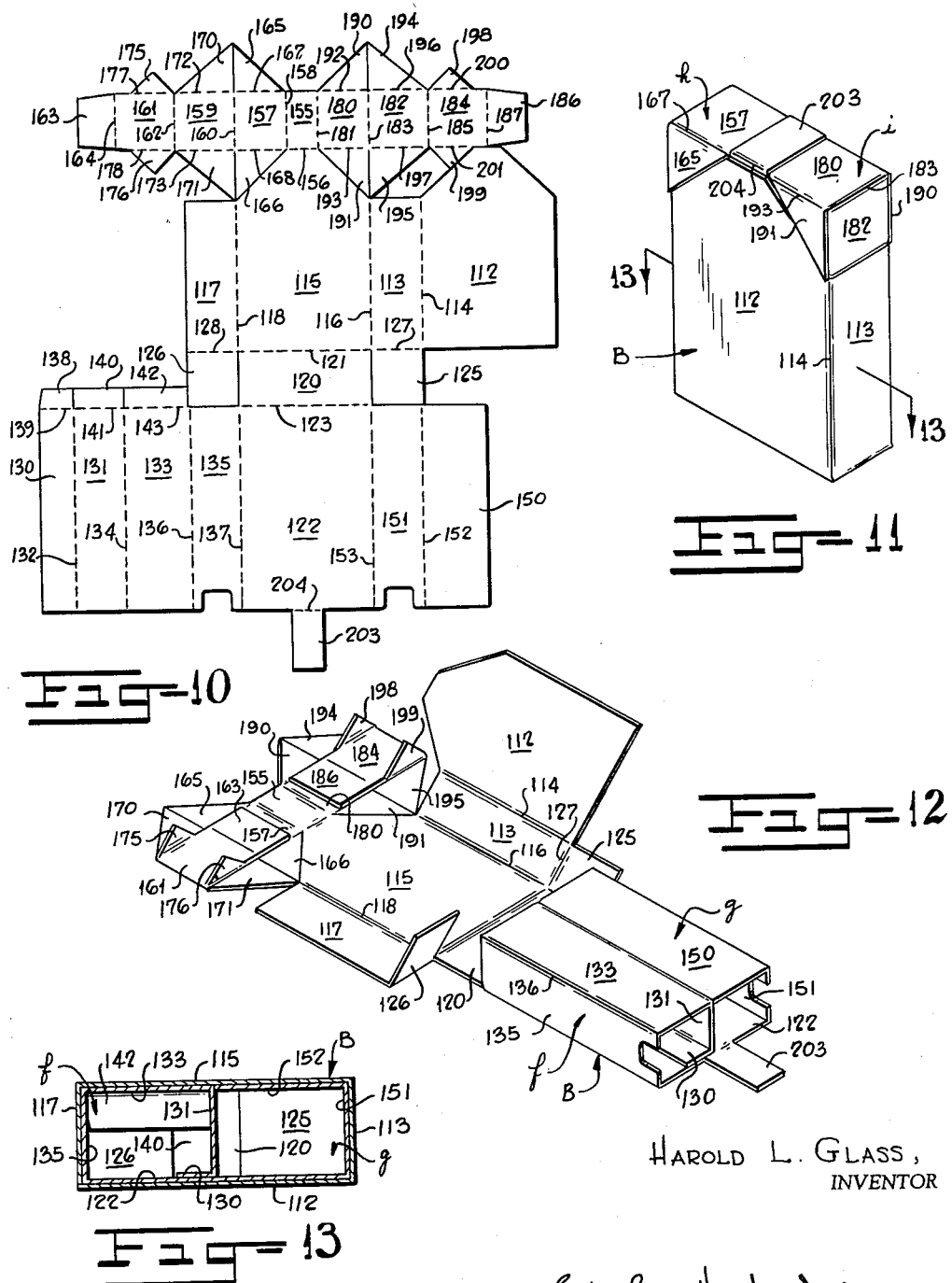

May 9, 1961 H. L. GLASS 2,983,424
MULTIPLE COMPARTMENT BOX
Filed May 28, 1957 6 Sheets-Sheet 4
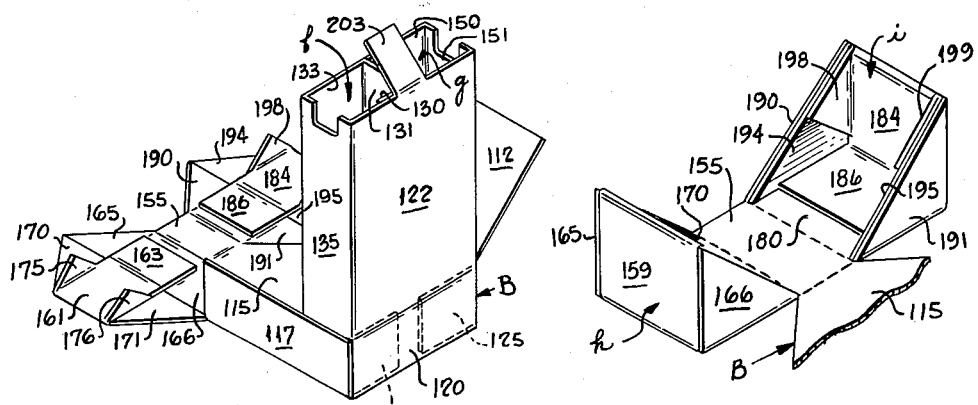
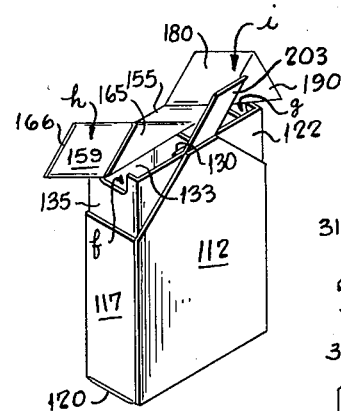
INVENTOR:
HAROLD L. GLASS
BY Eaton, Bell, Hunt + Seltzer
ATTORNEYS

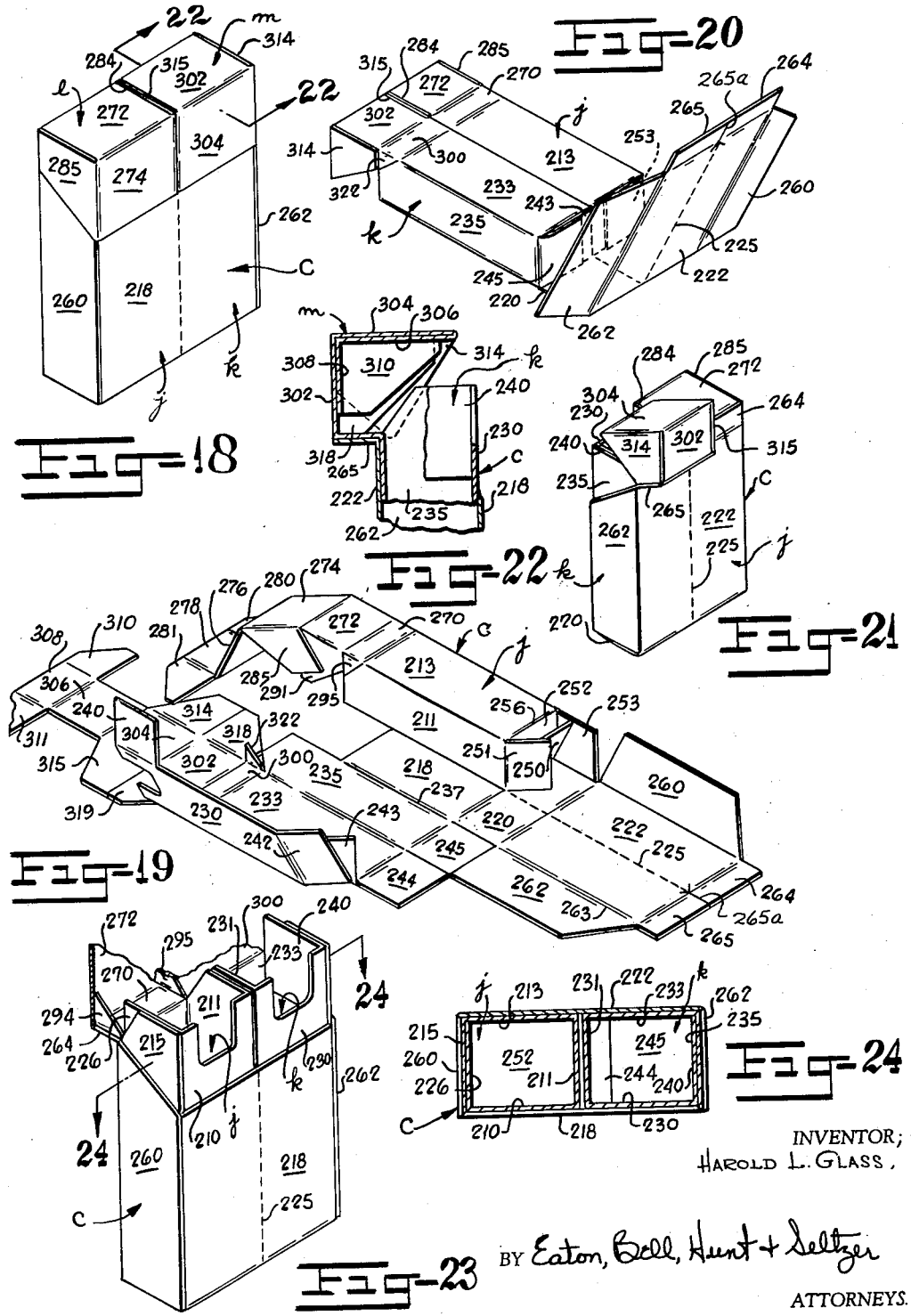

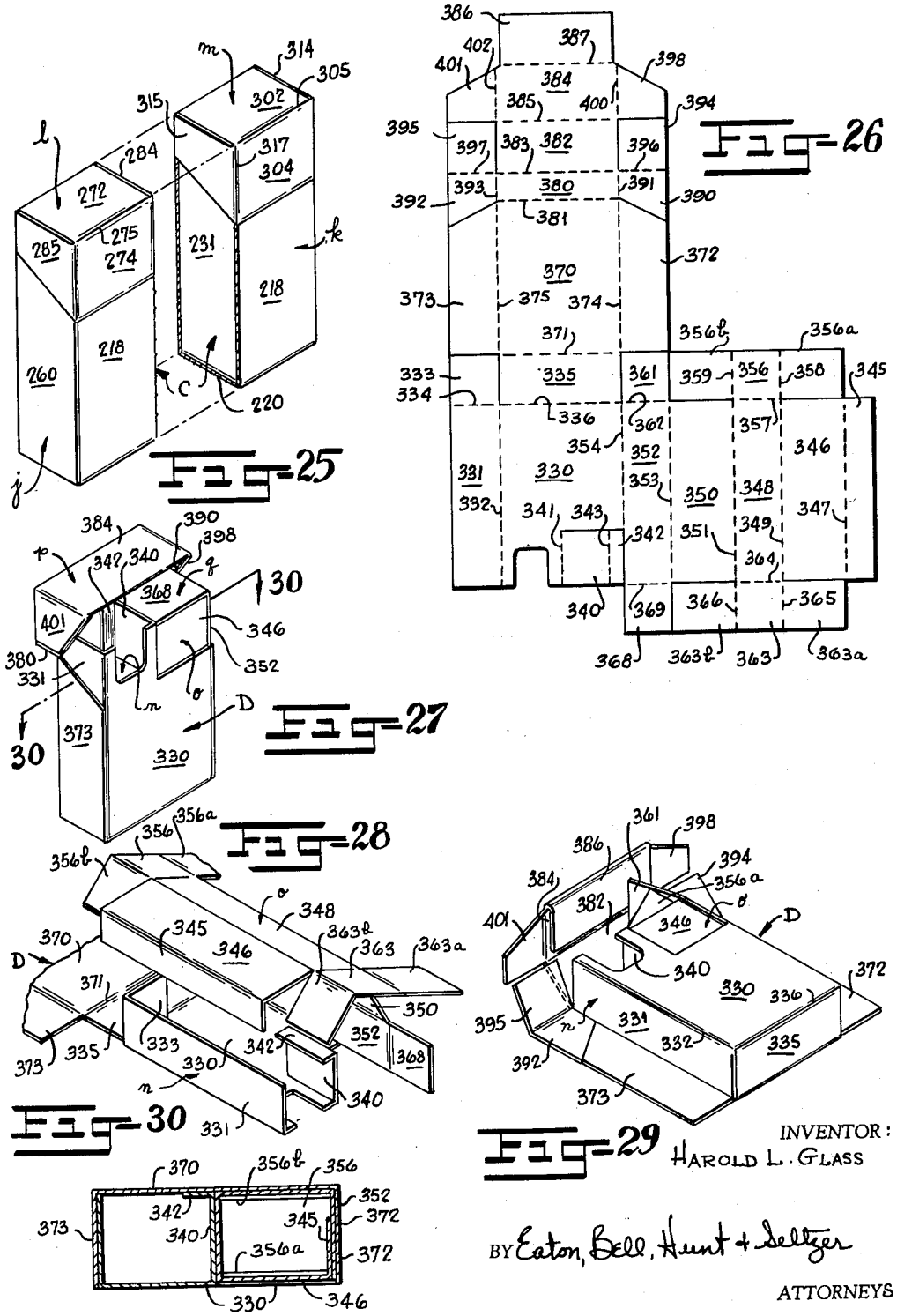

United States Patent Office 2,983,424
Patented May 9, 1961

2,983,424
MULTIPLE COMPARTMENT BOX
Harold L. Glass, Charlotte, N.C.
(5042 Marchant Drive, Nashville 4, Tenn.)
Filed May 28, 1957, Ser. No. 662,104
2 Claims. (Cl. 229—27)

This invention relates generally to a box made of paper, cardboard or the like having at least two compartments therein and each compartment of which is adapted to contain a separate supply of articles, such as cigarettes.

It is the primary object of this invention to provide a multiple compartment box, having at least two separate compartments with a separate cover for each compartment so that the contents of one compartment may be used without exposing the contents of the other compartment. The multiple compartment box may be utilized to package different types of articles in each compartment of a single package and prevent intermingling of the articles. Thus, when this type of box is used to package cigarettes, a first supply of cigarettes, packaged in one compartment, may be completely used before exposing the other compartment to maintain the freshness of the cigarettes in the second compartment while consuming the cigarettes in the first compartment. This compartmented box may also be used to package two different types of cigarettes, such as regular and mentholated cigarettes, one type in each compartment, so that the consumer may use either type of cigarette from either compartment without having to open both compartments each time a cigarette is removed and thus prevent intermingling of the flavors of the two types of cigarettes and maintain the cigarettes in segregated relationship from each other.

It is another object of this invention to provide a compartmented cigarette package having at least one hinged cover which forms at least a portion of four sides of the box to seal or close at least one compartment thereof. The compartmented box will also have more crush-resistant strength than a single compartment box and the box may be provided with means for readily separating the compartments from each other to reduce the bulk of the package before consuming any of the cigarettes or after consuming the cigarettes in one compartment.

It is a more specific object of this invention to provide a two-compartment cigarette box of the crush-resistant type having hinged covers for closing and sealing each compartment independently of the other and where the covers form a portion of the sides of the box. The cigarette box is formed from a single blank of sheet material such as paper, cardboard, or the like which has been die-cut and scored in such a manner that when formed into a box the outside surfaces of the box will all be formed from the same side of the blank so that printed indicia may be applied to only one side of the blank and the indicia will then appear on the outside of the box after it is formed from the blank.

Some of the objects of the invention having been stated, other objects will appear as the description proceeds when taken in connection with the accompanying drawings, in which—

Figure 1 illustrates a die-cut and scored blank from which the first form of double compartment box is formed;

Figure 2 is an isometric view of the blank shown in Figure 1 with the blank being partially folded;

Figure 3 is an enlarged vertical sectional view taken substantially along the line 3—3 in Figure 2;

Figure 4 is an isometric view looking upwardly from beneath the partially folded blank;

Figure 5 is a view similar to Figure 4 except looking downwardly from above the partially folded blank;

Figure 6 is a fragmentary isometric view looking at the inside of the completely formed cover indicated by the arrow 6 in Figure 5;

Figure 7 is an isometric view of the box with the closure members in partially open position;

Figure 8 is an isometric view of the box shown in Figure 7 with the covers in closed position and with the box revolved one hundred and eighty degrees;

Figure 9 is a vertical sectional view taken substantially along the line 9—9 in Figure 8;

Figure 10 illustrates a second modified form of die-cut and scored blank which may be used to form a second type of double compartment cigarette box;

Figure 11 is an isometric view of the completed box with both compartments being closed;

Figure 12 is an isometric view of the blank shown in Figure 10 in partially assembled position;

Figure 13 is an enlarged horizontal sectional view taken substantially along the line 13—13 in Figure 11;

Figure 14 is a view similar to Figure 12 and showing the blank additionally folded;

Figure 15 is an enlarged fragmentary isometric view of the completely assembled upper portion of the box including both of the covers;

Figure 16 shows the second form of cigarette box in its final step of assembly before completing the assembly of the box;

Figure 17 illustrates a die-cut and scored blank from which a third modified form of double compartment box may be assembled;

Figure 18 is an isometric view of the completely assembled third modified form of box formed from the blank illustrated in Figure 17;

Figure 19 is a view of the blank shown in Figure 17 with the blank being partially folded and assembled;

Figure 20 is a view similar to Figure 19 except showing the blank being additionally folded;

Figure 21 is an isometric view of the box, looking at the rear thereof, with one of the hinged covers in partially open position;

Figure 22 is a fragmentary vertical sectional view taken substantially along the line 22—22 in Figure 18 with the cover in partially open position;

Figure 23 is an isometric view of the box shown in Figure 18 with both of the hinged covers in open and broken away position;

Figure 24 is a horizontal sectional view taken substantially along the line 24—24 in Figure 23;

Figure 25 is an isometric view of the third modified form of box shown in Figure 18 and illustrating the manner in which the box may be split and divided into separate compartments;

Figure 26 illustrates a fourth form of die-cut and scored blank used to form a fourth modified form of cigarette box;

Figure 27 illustrates the fourth form of modified cigarette box in completely assembled position with one compartment cover being in partially open position and the other compartment cover being closed and sealed;

Figure 28 is an isometric view of the blank shown in

Figure 26 with the blank being shown in partially assembled position;

Figure 29 is a view similar to Figure 28 except showing the next progressive step in assembling the box from the blank shown in Figure 26;

Figure 30 is an enlarged horizontal sectional view taken substantially along the line 30—30 in Figure 27.

A first form of double compartment box A is shown in Figures 1 through 9, wherein the double compartment box is provided with compartments b and c having respective closure members or covers d and e. Referring to Figure 1, the blank used to form the double compartment box A is die-cut and scored to provide a front panel 10, a rear panel 11, a first side panel 12 connected to the front panel 10 along a score line 13 and a second side panel 14 connected to the front panel 10 along a score line 15. The compartment b is formed from the blank by a panel 16 connected to the rear panel 11 along a score line 17, a panel 18 connected to the panel 16 along a score line 19, a panel 20 connected to the panel 18 along a score line 21, and a panel 22 connected to the panel 20 along a score line 23. One end of the compartment b has a flap 24 connected to the panel 20 along a score line 25 and a flap 26 connected to the panel 18 along a score line 27. The other end of the compartment b has a tab 30 connected to the panel 20 along a score line 31.

The compartment c is formed from the blank by a panel 32 connected to the rear panel 11 along a score line 33, a panel 34 connected to the panel 32 along a score line 35, a panel 36 connected to the panel 34 along a score line 37, and a panel 38 connected to the panel 36 along a score line 39. One end of the compartment c has a flap 40 connected to the panel 36 along a score line 41, a flap 42 connected to the panel 34 along a score line 43, and a flap 44 connected to the panel 32 along a score line 45. The other end of the compartment c has a tab 46 connected to the panel 36 along a score line 47.

The rear panel 11 is provided with a first end panel 50 connected thereto along a score line 51 and a second end panel 52 connected to the front panel 10 along a score line 53 at one side and connected to the rear panel 11 along its other side by a score line 54. The side panels 12 and 14 have respective flaps 55 and 56 connected thereto along respective score lines 57 and 58 and the front panel 10 has a flap 60 connected thereto along a score line 61.

The closure member or cover e is formed from the blank (Figure 1) by a panel 62 connected to the second end panel 52 along a score line 63, triangularly shaped panels 64 and 65 connected at opposite sides of the panel 62 along respective score lines 66 and 67, a panel 70 connected to the panel 62 along a score line 71, triangularly shaped panels 72 and 73 connected to opposite sides of the panel 70 along respective score lines 74 and 75, a flap 76 connected to the panel 70 by a plurality of closely spaced score lines 77, and a flap 78 connected to the flap 76 along a score line 79.

The closure member or cover d is formed from a portion of the blank (Figure 1) including a panel 82 connected to the first end panel 50 by a score line 83, triangularly shaped panels 84 and 85 connected to opposite sides of the panel 82 along respective score lines 86 and 87, a panel 90 connected to the panel 82 by a score line 91, triangularly shaped panels 92 and 93 connected to opposite sides of the panel 90 along respective score lines 94 and 95, a flap 96 connected to the panel 90 by a plurality of score lines 97, and a panel 98 connected to the panel 96 by a score line 99.

In order to form the box A from the blank (Figure 1) the compartment b may be formed by bending or folding the blank along the respective score lines 17, 19, 21 and 23 and adhesively securing the panel 22 to the rear panel 11 (Figures 2 and 3) to form the sides of the compartment b. The flaps 24 and 26 may then be folded and adhesively secured together to close one end of the compartment b. The compartment c may be formed from the blank by folding the blank along the score lines 33, 35, 37 and 39 and adhesively securing the panel 38 to the rear panel 11 (Figures 2 and 3) to thus form the sides of the compartment c. The flaps 40, 42 and 44 may then be folded and adhesively secured together to close one end of the compartment c. The blank may then be folded along the score lines 13, 15, 53, 54, 57 and 58 (Figure 5), the flap 55 being adhesively secured to the panel 52 and the flap 56 being adhesively secured to the panel 60. The front panel 10 and connected panels may then be bent to partially encircle the compartments b and c and be adhesively secured thereto so that the front panel 10 assumes substantially the position shown in Figure 7 and the covers d and e may then be folded together in the following manner.

The cover d may be formed by bending along the fold lines 97 to form a male locking tab indicated at 100 (Figures 2 and 7) after adhesively securing the panels 96 and 98 to the respective panels 90 and 82. The panels 84 and 85 are then folded upwardly along the respective score lines 86 and 87, the panels 92 and 93 are folded upwardly along the score lines 94 and 95, the blank folded along the line 91 so that the panels 84 and 85 will be positioned inside of the panels 92 and 93 and the panels 84 and 85 are then adhesively secured to the panels 92 and 93 to form the cover d.

The side panel 12 is provided with a triangularly shaped tab 102 connected thereto by a plurality of score lines 103 and when folded along these score lines, as indicated in Figures 4, 5 and 7, a female locking tab 104 is formed (Figures 5 and 7) which is adapted to mate with the male locking tab 100 when the cover d is in a closed position to resiliently hold the cover d in a closed position. The cover d thus formed actually forms one corner of the box A and may completely close and seal the compartment b therein independently of the compartment c. Since the cover d, when closed, forms one corner of the box A, the cover d forms a portion of four different sides of the box A.

The cover e may be formed by folding the blank along the score lines 77 to form a male locking tab or member 106 (Figure 6) and thereafter adhesively securing the panels 76 and 78 to the respective panels 70 and 62. The panels 64 and 65 are bent upwardly along with the panels 72 and 73, and the blank is bent along the score line 71 so that the panels 72 and 73 engage and are adhesively secured to the outside surfaces of the panels 64 and 65 to complete the assembly of the cover e, as shown in Figure 6.

The side panel 14 is provided with a triangularly shaped tab 108 (Figure 1) connected to the side panel 14 by a plurality of score lines 109 which are adapted to be bent to form a female locking member 110 (Figure 5) which will mate with and resiliently hold the male locking member 106 of the cover e in closed position. The cover e also forms, when closed, one corner of the box A and completely closes and seals the compartment c independently of the compartment b. The cover e, when closed, thus forms a portion of four sides of the box A and may be opened and closed to permit access to the contents of the compartment c independently of the cover d.

Referring to Figures 10 through 16 there is shown a second modified form of double compartment box indicated broadly at B and which includes separate compartments f and g, each of which may be closed independently of the other by respective covers or closure members h and i. The blank (Figure 10) used to form the box B comprises a front panel 112, a side panel 113 connected to the front panel 112 along a score line 114, a rear panel 115 connected to the side panel 113 along a score line 116, and a side panel 117 connected to the rear panel 115 along a score line 118. The blank (Figure 10) also includes a bottom panel 120 connected to one edge of the rear panel 115 along a score line 121, a front backing panel 122 connected to the bottom panel 120 along a score line 123, and the respective side panels 113 and 117 are provided with flaps 125 and 126 connected to the panels 113 and 117 by respective score lines 127 and 128.

The compartment f is formed from the blank (Figure 10) by a panel 130 connected to a panel 131 along a score line 132, a panel 133 connected to the panel 131 along a score line 134, and a panel 135 connected at one side to the panel 133 along a score line 136 and at its other side to the front backing panel 122 by a score line 137. The compartment f also includes an end tab 138 connected to the panel 130 along a score line 139, an end tab 140 connected to the panel 131 along a score line 141, and an end tab 142 connected to the panel 133 along a score line 143. The compartment g is formed from the blank (Figure 10) by a panel 150 connected to a panel 151 along a score line 152 and the panel 151 is connected to the front backing panel 122 along a score line 153.

The compartment f is formed by bending the blank along the score lines 132, 134, 136 and 137 so that the panel 130 may be adhesively secured to the medial portion of the front backing panel 122 (Figure 13). The flaps 138, 140 and 142 may then be bent inwardly to partially close one end of the compartment f. The compartment g is formed by bending the blank along the score lines 152 and 153 so that the panels 150 and 151 assume the position shown in Figures 12 and 13. Thus, two side-by-side compartments f and g are provided with are separated from each other by the panel 131 and which have a common side (front backing panel 122) forming a part of both compartments f and g. The flaps 125 and 126 may then be bent upwardly, the panels 113 and 117 bent upwardly and the flaps 125 and 126 adhesively secured to the bottom panel 120 (Figure 14). The rear panel 115 may then be adhesively secured to the panels 150 and 133 of the respective compartments g and f so that the box is completed (Figure 16) except for the covers h and i.

The cover member h may then be formed from the blank (Figure 10) by a hinged panel 155 connected to the rear panel 115 along a score line 156, a top panel 157 connected to the panel 155 along a score line 158, a side panel 159 connected to the top panel 157 along a score line 160, a reinforcing panel 161 connected to the side panel 159 along a score line 162, a second reinforcing panel 163 connected to the reinforcing panel 161 along a score line 164. The cover member h also includes triangularly shaped panels 165 and 166 connected to opposite sides of the top panel 157 along respective score lines 167 and 168, respective triangularly shaped panels 170 and 171 connected to opposite sides of the side panel 159 along respective score lines 172 and 173, and triangularly shaped reinforcing tabs 175 and 176 connected to the reinforcing panel 161 along respective score lines 177 and 178. The closure member h may be formed by bending the blank along the score line 162 and adhesively securing the reinforcing panels 161 and 163 to the respective side and top panels 159 and 157, bending the respective triangularly shaped panels 165, 166, 170 and 171 upwardly along the score lines 167, 168, 172 and 173 and adhesively securing the panels 165 and 166 to the outer surfaces of the panels 170 and 171 after bending the blank along the superposed score lines 160 and 164 to complete the assembly of the closure member h.

The closure member i may be formed from the blank (Figure 10) by a top panel 180 connected to the hinged panel 155 along a score line 181, a side panel 182 connected to the panel 180 along a score line 183, a reinforcing panel 184 connected to the panel 182 along a score line 185, and a second reinforcing panel 186 connected to the panel 184 along a score line 187. The closure member i also includes triangularly shaped panels 190 and 191 connected to opposite sides of the panel 180 by respective score lines 192 and 193, triangularly shaped panels 194 and 195 connected to opposite sides of the panel 182 by respective score lines 196 and 197 and triangularly shaped reinforcing panels 198 and 199 connected to opposite sides of the panel 184 by respective score lines 200 and 201. The closure member i may then be formed by folding the blank along the score line 185, adhesively securing the panels 184 and 186 to the respective panels 182 and 180, folding the triangularly shaped panels 190, 191, 194 and 195 upwardly, after folding the superposed score lines 187 and 183 and adhesively securing the triangularly shaped panels 190 and 191 to the outside surfaces of the triangularly shaped panels 194 and 195 (Figure 15).

With both of the closure members h and i in the assembled position, shown in Figure 16, the blank may be folded along the score line 156 and a securing tab 203, connected to the edge of the front backing panel 122 along a score line 204, may be adhesively secured to the upper surface of the hinged panel 155 to secure the cover members h and i in position at the top of the box B (Figure 11).

Thus, the closure members h and i may be moved to open or closed position and when in the closed position they independently close the respective separate compartments f and g of the box B. With the covers h and i in closed position, they actually form the upper corners of the box B and form a portion of four walls thereof.

Referring to Figures 17 through 25, a third modified form of double compartment box, broadly indicated at C, is shown and which includes individual compartments j and k which are separate from each other and each of which has respective separate closure means or covers broadly indicated at l and m respectively.

The box C may be formed from a die-cut and scored blank (Figure 17) which includes a panel 210 connected to a panel 211 by a score line 212, a panel 213 connected to the panel 211 by a score line 214, a panel 215 connected to the panel 213 by a score line 216, and a front panel 218 connected to the panel 215 by a score line 219. The panel 210 is provided with a tab 226 connected thereto by a score line 227. The blank also includes a bottom panel 220 connected to the front panel 218 by a score line 221 and a rear panel 222 connected to the bottom panel 220 by a score line 223. The front panel 218, the bottom panel 220 and the rear panel 222 may be provided with a perforated tear line 225 to facilitate separating the front, bottom and rear panels if desired, in a manner to be later described. The blank also includes a panel 230 connected to a panel 231 as by a score line 232, a panel 233 connected to the panel 231 by a score line 234, and a panel 235 connected to the panel 233 by a score line 236 and also connected to the front panel 218 by a score line 237. The panel 230 is provided with a tab 240 connected thereto by a score line 241 and the blank is also provided with tabs or flaps 242, 243, 244 and 245 connected to the respective panels 230, 231, 233 and 235 by respective score lines 246, 247, 248 and 249. The panels 210, 211, 213 and 215 are provided with respective flaps 250, 251, 252 and 253 connected thereto by respective score lines 254, 255, 256 and 257.

In order to form the compartment j, the blank may be folded along the score lines 212, 214, 216 and 219 and the panel 210 and tab 226 adhesively secured to the respective front panel 218 and panel 215 (Figure 19) and one end of the compartment j may be closed by bending the respective flaps 250 through 253, in the manner shown in Figure 19, and adhesively securing them together. The compartment k may be formed by folding the blank (Figure 17) along the score lines 232, 234, 236 and 237 and adhesively securing the flap 240 to the panel 235 and the panel 230 to one-half of the front panel 218. The lower or bottom end of the compartment k may then be closed by overlapping the flaps 242, 243, 244 and 245 and adhesively securing them together (Figure 20). The rear panel 222 is provided with a side panel 260 connected to one side of the rear panel 222 along a score line 261 and a side panel 262 connected to the opposite side of the rear panel 222 along a score line 263, and a pair of hinged flaps 264 and 265 connected to the rear panel 222 by respective score lines 266 and 267. The flaps 264 and 265 are separated by a cut line 265a, the inner end of which diverges into the rear panel 222 at opposite sides of the perforated tear line 225. The outwardly diverging ends of the cut line 265a provide springiness to the closure members l and m since they are hinged along the score lines 266 and 267 when the blank is assembled. After the compartments j and k have been formed, the bottom panel 220 and the rear panel 222 may be adhesively secured to the panels 213 and 233 of the compartments j and k and the side panels 260 and 262 secured to the panels 215 and 235 of the compartments j and k to complete the box C except for the closure members l and m.

The closure member or cover l may be formed from the blank (Figure 17) which includes a hinge flap 270 connected to the panel 213 along a score line 271, a top panel 272 connected to the flap 270 along a score line 273, and a front panel 274 connected to the panel 272 along a score line 275. The blank also includes a reinforcing panel 276 connected to the panel 274 along a score line 277, a reinforcing panel 278 connected to the panel 276 along a score line 279, and reinforcing tabs 280 and 281 connected to opposite sides of the panel 278 by respective score lines 282 and 283. The panel 274 is provided with side panels 284 and 285 connected to opposite sides of the panel 274 along score lines 286 and 287, the panel 272 is provided with side panels 290 and 291 connected to opposite sides of the panel 272 by score lines 292 and 293 and reinforcing tabs 294 and 295 are connected to opposite sides of the panel 270 by respective score lines 296 and 297.

In order to assemble the cover l from the blank (Figure 17) the reinforcing panels 276 and 278 may be folded along the score line 277 and adhesively secured to the respective panels 274 and 272, the panels 284, 285, 290 and 291 bent upwardly and adhesively secured together so that the panels 284 and 285 are secured to the outside surfaces of the panels 290 and 291, the panels 280 and 281 adhesively secured on the inside of the panels 290 and 291 to reinforce the cover member l and the tabs 294 and 295 adhesively secured to the outer surfaces of the respective panels 290 and 291 upon bending the cover member l along the score line 273.

The cover l, thus formed, is adapted to close the compartment j and will resist opening since the front and side edges thereof will engage the upper ends of the panels 210, 211 and 215 but may be opened by applying upward pressure on the front edge of the cover l and upon being fully opened, free access to the contents of the compartment j is provided. The cover l, when closed, thus forms a portion of four sides of the box C.

The cover member m may be formed from the blank (Figure 17) by a hinge panel 300 connected to the panel 233 by a score line 301, a top panel 302 connected to the panel 300 by a score line 303, and a front panel 304 connected to the panel 302 by a score line 305. The blank also includes a reinforcing panel 306 connected to the panel 304 by a score line 307 and a reinforcing panel 308 connected to the panel 306 by a score line 309. The panel 308 is provided with angularly shaped tabs 310 and 311 connected at opposite sides thereof by respective score lines 312 and 313, the panel 304 is provided with side tabs 314 and 315 connected to opposite sides thereof by respective score lines 316 and 317, the panel 302 is provided with tabs 318 and 319 connected to the opposite sides of the panel 302 by respective score lines 320 and 321, and the panel 300 is provided with tabs 322 and 323 connected to opposite sides of the panel 300 by respective score lines 323a and 324.

In order to assemble the cover member m from the blank (Figure 17), the blank may be folded along the score line 307 and the reinforcing panels 306 and 308 adhesively secured to the respective panels 304 and 302 and the tabs 310 and 311 adhesively secured to the panels 318 and 319. The panels 314, 315, 318 and 319 may then be bent upwardly, the panels 314 and 315 adhesively secured to the outside surfaces of the panels 318 and 319 after bending along the superposed score lines 305 and 309 and then the tabs 322 and 323 may be bent upwardly and adhesively secured to the panels 318 and 319 to complete the assembly of the cover member m.

The completed cover m may then be used to close the compartment k and will resist opening since the front edges thereof will engage the upper edges of the panels 230, 231 and 235. The cover m, when closed, forms a portion of four sides of the box C. The box C thus formed may be used to contain a supply of cylindrical objects, such as cigarettes, and the individual covers l and m for the respective compartments j and k may be opened independently of each other to expose the contents of either of the compartments in the box C.

The box C may also be provided with the perforated line 225 extending throughout the length of the front panel 218, bottom panel 220 and rear panel 222, so that the compartments j and k may be separated or torn apart from each other to reduce the bulk of the box C. After the box C is torn apart (Figure 25), each compartment j and k will have its own cover l and m to avoid spilling the contents therefrom as well as to insure freshness of articles, such as cigarettes.

A fourth modified form of box broadly indicated at D is illustrated in Figures 26 through 30 and includes a pair of compartments n and o. The compartment o has a closure member or cover q adapted to close the upper end of the compartment o and the compartment n has a closure member or cover p which forms a portion of four sides of the box D and, when closed, covers both of the compartments n and o (Figure 27).

The box D is formed from a blank (Figure 26) which includes a front panel 330, panel 331 connected to the panel 330 along a score line 332, a tab 333 connected to the panel 331 along a score line 334 and a bottom panel 335 connected to the panel 330 along a score line 336. The panel 330 is provided with a relatively short panel 340 connected to the panel 330 along a score line 341 and a tab 342 connected to the panel 340 along a score line 343.

The blank also includes a panel 345 connected to a panel 346 by a score line 347, a panel 348 connected to the panel 346 by a score line 349, a panel 350 connected to the panel 348 by a score line 351, and a panel 352 connected to the panel 350 by a score line 353 and also connected to the panel 330 by a score line 354. The blank also includes a tab 356 connected to the panel 348 along a score line 357, tabs 356a and 356b connected to opposite sides of the tab 356 along score lines 358 and 359 and a tab 361 connected to the panel 352 along a score line 362. The blank also includes a tab 363 connected to the panel 348 along a score line 364, tabs 363a and 363b connected to opposite sides of the tab 363 along score lines 365 and 366, and a tab 368 connected to the panel 352 along a score line 369.

In order to form the compartment o from the blank (Figure 26) the score lines 347, 349, 351, 353 and 354 are folded (Figure 28) and the panel 345 is adhesively secured to the medial portion of the panel 330 after the panels 340 and 342 have been folded upwardly to the position shown in Figure 28. The tabs 356a and 356b may then be folded inwardly and the tab 356 bent to close one end of the compartment o with the tabs 356a and 356b adhesively secured to the inside surfaces of the panels 346 and 350. The panel 331 may then be folded upwardly along the score line 332, the tabs 333 and 361 folded inwardly (Figure 28) and the bottom panel 335 folded upwardly into adhesive engagement with the tabs 333 and 361. The blank also includes a back panel 370 which is connected to the bottom panel 335 along a score line 371 and the panel 370 may be adhesively secured to the tab 342 of the compartment n and the panel 350 of the compartment o (Figure 29).

The back panel 370 is provided with side panels 372 and 373 connected to opposite sides of the panel 370 along respective score lines 374 and 375, a rear panel 380 connected to the panel 370 along a score line 381, a top panel 382 connected to the panel 380 along a score line 383, a front panel 384 connected to the panel 382 along a score line 385, and a reinforcing panel 386 connected to the panel 384 along a score line 387. The panel 380 is provided with an inside side tab 390 connected to the panel 380 along a score line 391 and a side tab 392 connected to the panel 380 along a score line 393. The side tabs 390 and 392 are provided with respective reinforcing tabs 394 and 395 connected to the panels 390 and 392 along respective score lines 396 and 397. The panel 384 is provided with an outside side panel 398 connected to one side of the panel 384 along a score line 400 and an outside side panel 401 connected to the opposite side of the panel 384 along a score line 402.

The compartment o may be closed by bending the blank along the lines 364, 365 and 366 so that the tabs 363a and 363b extend down inside of the panels 346 and 350 and bending the blank along the score line 369 so that the tab 368 overlies the tab 363 (Figures 27 and 29).

The cover p may next be formed by folding and adhesively securing the reinforcing panel 386 to the front panel 384 (Figure 29), bending the tabs 394 and 395 upwardly, folding the score lines 383 and 385 to adhesively secure the tabs 394 and 395 to the top panel 382, and then adhesively securing the side panels 398 and 401 to the outside surfaces of the respective panels 390 and 392. The cover p, thus formed, may then be moved to closed position so that the front surface thereof will engage the upper portions of the front panel 330 and the front edges of the panels 346 and 352 to resiliently hold the cover p in a closed position and resist opening thereof since the hinge point, along the score line 381, is positioned lower than the juncture of the top panel 382 and front panel 384.

Thus, the box D is provided with two independent compartments n and o with a cover or closure member p provided for the compartment n which also encloses the cover member g and the compartment o. The cover p, when closed, thus forms the top of the box D and a portion of four sides of the box D.

Although the locking tabs for the covers d and e of the box A are shown associated with the box A only, it is to be understood that these locking tabs could also be provided for use with the covers h and i associated with the box B. Also, although the perforated tear line 225 for dividing the compartments is shown associated with the box C only, it is to be understood that the boxes A and B could be provided with a perforated tear line between the respective compartments b, c and f, g so that these boxes could be split into two individual boxes, either before or after consuming the contents of either compartment. In all four modified forms of the compartmented boxes (A, B, C and D) the dividing walls between compartments are shown extending from the front wall to the rear wall of the box, but it is to be understood that the dividing wall could extend between the opposite side walls of the box.

It is thus seen that there has been provided a double compartment box which may be made of a single piece of sheet material, such as cardboard, adapted to hold a group of articles in each compartment, wherein the compartments are separately sealed from each other and the box is provided with at least one closure member which forms a portion of the sides of the box when the closure member is in closed position.

In the drawings and specification there have been set forth several embodiments of the invention and, although specific terms are employed, they are used in a generic and descriptive sense only and not for purposes of limitation, the scope of the invention being defined in the claims.

I claim:

1. A box formed from a single sheet of paper material comprising a front wall, a rear wall, a bottom wall, a top wall, first and second end walls, a partition having two separable plies extending between and connected to said front and rear walls independently of each other, said partition being interposed between said first and second end walls in spaced parallel relationship with respect thereto and providing first and second compartments in said box, a first closure member closing said first compartment, said first closure member being hinged on said rear wall and forming portions of the rear, top, front and first end walls, a second closure member separate from said first closure member closing said second compartment, said second closure member being hinged on said rear wall and forming portions of the rear, top, front and second end walls, said first and second closure members having adjacent end panels intermediate of and parallel to said first and second end walls of the box, said adjacent end panels of said first and second closure members being received between the plies of said partition in respective overlying relationship to the ply corresponding thereto along the upper portion thereof, and a weakened line extending along the front, bottom and rear walls of said box in juxtaposition to the bounds of said partition, said weakened line lying in a plane bisecting said box and passing between the two plies of said partition, whereby the box may be torn apart along said weakened line to divide the box into a pair of separate independent box members provided with said first and second compartments closed by said first and second closure members respectively.

2. A box formed from a single sheet of paper material comprising a body having a front wall, a rear wall, a bottom wall, first and second end walls, and a partition having two separable plies extending between and connected to said front and rear walls independently of each other; said partition being interposed between said first and second end walls in spaced parallel relationship with respect thereto and providing first and second compartments in said box, an upper body portion extending through said first end wall, said front wall and said second end wall having a reduced thickness relative to the adjacent body portion extending through said first end wall, said front wall, and said second end wall, the juncture between said upper body portion of reduced thickness and said adjacent body portion defining shoulders on said first end wall, said front wall, and said second end wall, a first closure member closing said first compartment, said first closure member being hinged on said rear wall, said first closure member abutting said shoulder on said first end wall and a portion of said shoulder on said front wall, a second closure member separate from said first closure member closing said second compartment, said second closure member being hinged on said rear wall, said second closure member abutting said shoulder on said second end wall and the remaining portion of said shoulder on said front wall, said first and second closure members cooperating to define a segmental top wall for the box, said first and second closure members having adjacent end panels intermediate of and parallel to said first and second end walls of said body, said adjacent end panels of said first and second closure members being received between the plies of said partition in respective overlying relationship to the ply corresponding thereto along the upper portion thereof, and a weakened line extending along the front, bottom and rear walls of said body in juxtaposition to the bounds of said partition, said weakened line lying in a plane bisecting said body and passing between the two plies of said partition, whereby said body may be torn apart along said weakened line to divide the box into a pair of separate independent box members provided with said first and second compartments completely closed by said first and second closure members respectively.

References Cited in the file of this patent

UNITED STATES PATENTS

| | | |
|---|---|---|
| 276,171 | Fraser | Apr. 24, 1883 |
| 1,016,148 | Heinicke | Jan. 30, 1912 |
| 1,256,965 | Williams | Feb. 19, 1918 |
| 2,047,033 | Ringler | July 7, 1936 |
| 2,049,680 | Adams | Aug. 4, 1936 |
| 2,163,828 | Chalmers | June 27, 1939 |
| 2,472,674 | Morand | June 7, 1949 |
| 2,591,135 | Chalmers | Apr. 1, 1952 |